(12) United States Patent
Scholtz et al.

(10) Patent No.: US 8,157,661 B2
(45) Date of Patent: Apr. 17, 2012

(54) BELLOWS COMPRISING A RECEIVER FOR A RETAINING RING AND METHOD FOR PRODUCING THE SAME

(75) Inventors: Thorsten Scholtz, Rheinbreitbach (DE); Markus Deisinger, Siegberg (DE); Ralf Schumacher, Cologne (DE)

(73) Assignee: GKN Driveline International GmbH, Lohmar (DE)

( * ) Notice: Subject to any disclaimer, the term of this patent is extended or adjusted under 35 U.S.C. 154(b) by 216 days.

(21) Appl. No.: 12/443,669

(22) PCT Filed: Sep. 29, 2006

(86) PCT No.: PCT/EP2006/009481
§ 371 (c)(1),
(2), (4) Date: Apr. 17, 2009

(87) PCT Pub. No.: WO2008/040368
PCT Pub. Date: Apr. 10, 2008

(65) Prior Publication Data
US 2010/0040405 A1 Feb. 18, 2010

(51) Int. Cl.
*F16D 3/84* (2006.01)
*B29C 49/00* (2006.01)
(52) U.S. Cl. .................................... 464/175; 264/506
(58) Field of Classification Search .......... 464/173–175; 277/634–636; 264/505, 506
See application file for complete search history.

(56) References Cited

U.S. PATENT DOCUMENTS

| 4,464,980 | A | * | 8/1984 | Yoshida | 264/506 |
|---|---|---|---|---|---|
| 5,236,656 | A | * | 8/1993 | Nakajima | 264/506 |
| 5,311,912 | A | * | 5/1994 | Hayward | 464/175 |
| 5,318,740 | A | * | 6/1994 | Sadr et al. | 264/506 |
| 5,330,342 | A | * | 7/1994 | Linss et al. | 264/506 |
| 5,765,837 | A | * | 6/1998 | Schwarzler | 277/636 |
| 5,900,205 | A | * | 5/1999 | Sadr et al. | 264/506 |
| 6,010,657 | A | * | 1/2000 | Wydra et al. | |
| 6,209,885 | B1 | | 4/2001 | Mukaida et al. | |
| 6,464,233 | B1 | * | 10/2002 | Oetiker | 277/636 |
| 6,547,669 | B1 | | 4/2003 | Neviani | |
| 7,699,710 | B2 | * | 4/2010 | Wette | 464/173 |
| 2002/0182355 | A1 | | 12/2002 | Kawamoto et al. | |
| 2007/0042827 | A1 | * | 2/2007 | Deisinger | 464/175 |

FOREIGN PATENT DOCUMENTS

| CN | 1320198 | 10/2001 |
|---|---|---|
| EP | 0990810 A1 | 4/2000 |
| JP | 2006258122 A | 9/2006 |

OTHER PUBLICATIONS

First Office Action dated Jan. 8, 2010 from State Intellectual Property Office, P.R. China for App. No. 200680055967.3.
PCT International Search Report for PCT/EP2006/009481 dated Mar. 27, 2007.

* cited by examiner

*Primary Examiner* — Gregory Binda
*Assistant Examiner* — Josh Skroupa
(74) *Attorney, Agent, or Firm* — Rader, Fishman & Grauer, PLLC

(57) ABSTRACT

A bellows for a joint arrangement may include pleats, an axis and a joint end, a zone of the joint end being produced by blow molding and forming a receiver for a retaining ring. The receiver, in the proximity of the pleats, has a plurality of outward-pointing bulged portions that form a recess and at least one inclined receiving edge.

6 Claims, 4 Drawing Sheets

BELLOWS COMPRISING A RECEIVER FOR A RETAINING RING AND METHOD FOR PRODUCING THE SAME

CROSS-REFERENCE TO RELATED APPLICATIONS

This application is a National Stage application which claims the benefit of International Application No. PCT/EP2006/009481 filed Sep. 29, 2006 which is hereby incorporated by reference in its entirety.

BACKGROUND

The present disclosure relates to a bellows for a joint arrangement comprising pleats, an axis and a joint front face, in which a region of the joint front face is produced by blow molding and forms a receiver for a retaining ring. The disclosure further relates to a method for producing such a bellows.

The disclosure relates, in particular, to a sealing system for a tripod joint which is used, for example, for torque transmission in motor vehicles. In this connection, bellows are connected, on the one hand, to a joint part (the so-called "big end") and, on the other hand, connected to a shaft (the so-called "small end"). For fastening the bellows to the joint part (and to the shaft), a retaining ring is usually used which is positioned in a specific receiver of the bellows, before mounting the joint. It has to be ensured, therefore, that the position of the retaining ring in the receiver remains substantially unaltered during mounting. It also has to be ensured, therefore, that the retaining ring may be easily pushed over the bellows so that it engages in the receiver provided therefor. To this end, it is known to form a raised portion extending over the circumference of the bellows which define the receiver.

BRIEF SUMMARY

Various methods may be used for producing the bellows and/or such a receiver, in particular on the side of the bellows which is connected to the joint. Depending on the material of the bellows, in this connection internal high pressure forming and/or an injection molding method may be used. The production of the boundary of the receiver from solid material, as may occur, for example, with rubber materials, takes place by injection molding or press molding. Bellows which are produced from thermoplastic material are made at least substantially using an internal high pressure method, in particular so-called "press blow molding". This method may result in a uniform formation of pleats in the bellows.

There exists a need for a bellows that insures repeated mounting and dismantling of a retaining ring toward the bellows in a secure manner without, for example, damaging the receiver. Moreover, the receiver is intended to be formed so that the receiver may be easily produced within the context of mass production. As such, there exists a need for a suitable production method.

A bellows is disclosed in accordance with the features of claim 1. In addition, a method of producing a bellows is also disclosed in accordance with the features of claim 5. Various embodiments of the disclosure are provided in the dependent claims. Reference is made to the fact, that the features provided individually in the claims may be combined with one another in any technologically meaningful manner and demonstrate further embodiments of the disclosure. Variants of the disclosure also emerge from the description and the description of the figures.

One embodiment of a bellows for a joint arrangement comprises pleats, an axis and a joint front face, in which a region of the joint front face is produced by blow molding, and forms a receiver for a retaining ring. The receiver is positioned in the vicinity of the pleats with a plurality of outwardly oriented bulged portions, which form a recess and at least one receiving edge.

With regard to the bellows it bears noting that the bellows generally has an approximately conical shape, so that the openings, respectively formed on faces of the bellows, have diameters of different sizes; a small opening and a large opening. The small opening is used, therefore, for fixing the bellows to a shaft, whilst the large opening is used for fastening to the joint. Henceforth it is possible to make the bellows using different production methods; for example the front face, which has to be mounted onto the shaft, may be produced by an injection molding method. The pleats of the bellows, the region of the joint front face with the receiver for the retaining ring are produced in the bellows according to an embodiment of the disclosure, by blow molding, and in particular so-called "press blow molding". The production method of the bellows has a direct influence on the nature of the bellows, so that the material cross sections, in particular, are designed to be different from one another.

The receiver for the retaining ring extends in a peripheral direction of the bellows. It may be designed, in particular, in the manner of a groove. A boundary of the receiver toward the joint may be designed in any known manner. Another boundary, namely in the direction of the pleats, is designed with a plurality of outwardly oriented bulged portions. In one particular embodiment, there are at least four, (or even more) of such bulged portions provided. These bulged portions may be distributed at regular intervals over the circumference of the bellows in the region of the joint front face. The purpose of the bulged portions, for example, is that a retaining ring placed over the joint front face is retained in the receiver when mounted on the joint arrangement. In this manner, the retaining ring, even when vertically mounted toward the pleats, is prevented from slipping out of the receiver and/or becoming skewed. Accordingly, this bulged portion thus forms a receiving edge on the side toward the receiver. In a peripheral direction, the receiver is now formed by a plurality of receiving edges of the bulged portions defined by the circumference and spaced apart from one another, so that a receiving edge extending in the peripheral direction toward the pleats is not provided. In this manner, using the same amount of material, it is possible to produce bulged portions which, for example, are higher and/or extend further radially outwards, which insure reliable positioning of the retaining ring.

In order to illustrate the difference relative to the production of the bulged portions, reference is made to the fact that the bulged portions form a recess. This means, in particular, that the bulged portions do not have a solid cross section. In other words, this also means that, relative to the cross section, an upper edge of the bulged portion has, for example, a curved path and a corresponding underside (substantially) follows this path. As a result, an accumulation of material is avoided in the region of the receiver.

According to one particular variant of the bellows, the receiving edge has at least in the vicinity of a domed portion an angle which, with a plane perpendicular to the axis of the bellows, is in a range of up to 45 degrees. In one exemplary embodiment, the range is about 20 degrees to 45 degrees. It is understood that the receiving edge (at least in a radial external region) does not form a right angle with the receiver. Instead, the domed portion runs obliquely toward the pleats, extending from the receiver. The angle is, in this case, relatively shallow but has considerable advantages with regard to the accurate production of the bulged portions using the blow molding method. In particular, in this manner the formation of a seam and/or tearing in the region of the domed portions of the bulged portion, which is common in the production method, may be avoided. As a result of the surface of the bulged portion, which is thus relatively uniform, undesirable damage to the surface by contact with the other components and/or the retaining ring is avoided. Similarly, re-machining the surface of the bellows can possibly be dispensed with.

In one variant of disclosure, the oblique receiving edge is formed by a chamfer. The wall thickness may be reduced in the region of the chamfer. In particular, a path of an upper face and a lower face of the bulged portion may be designed differently in the region of the chamfer, in particular a flat upper face and a curved lower face of the bulged portion being present. The chamfer extends, in particular, over a region of at least 1 mm. In one exemplary embodiment, the chamfer extends in particular, in a range of about 1.5 to 2 mm. Also, with such a design of the bulged portion, tearing may be markedly reduced and/or avoided during production by means of blow molding.

In one embodiment, the bulged portions are configured to have an average wall thickness which corresponds to an adjacent pleat. As already explained, the wall thickness may vary over the path of the bulged portion. The term "average" wall thickness thus indicates an average value of the wall thickness. It is clear that the wall thickness in the region of the bulged portion and the pleat is dictated by functional factors, and thus may be subjected to small variations, but in particular with regard to "press blow molding" substantially the same average wall thickness of the bulged portion and the pleat may be produced.

According to a further aspect of the disclosure, a method for producing a bellows is provided which comprises at least the following steps:

a) providing a die with an internal surface which generally corresponds to an outer shape of the bellows with pleats and with a receiver for a retaining ring, a plurality of bulged portions being provided in a region of the receiver in the vicinity of indentations that generally corresponds to the pleats, and which form an oblique bearing surface,
b) positioning a hollow body with an internal region in the die,
c) introducing a pressurized medium into the internal region, the hollow body being expanded such that said hollow body comes to bear against the internal surface and forms the bellows, and
d) removing the bellows from the die.

The method outlined above is, in particular, suitable for producing the bellows disclosed in the disclosure.

In this connection, reference is made to a "press blow molding" method which is, in particular, explained once again with reference to FIGS. 5 to 8. Moreover, details of the method may be derived, for example, from EP 0 535 254 A1, the contents of which are incorporated herein by reference in its entirety. The explanations therein of the production method may be used for explaining the "press blow molding" method and thus form part of the present description.

In this case, the die is designed with an oblique bearing surface in the region of the plurality of bulged portions in order to produce a flattened and/or oblique receiving edge of the bulged portions of the bellows.

For producing a joint arrangement, in particular a tripod joint, at least one joint outer part is provided with a hollow space and a joint inner part is provided with a plurality of rolling bodies, which is arranged pivotably and rotatably in the hollow space. The rolling bodies are joined together to a bellows according to the disclosure or a bellows which has been produced by the disclosed method, such that the hollow space and the joint inner part are surrounded by the bellows. The secure mounting is thus insured via the newly formed receivers for the retaining ring. The bellows may, in this case, additionally receive a sliding and/or lubricating means, in order to allow the relative movements of joint inner part, bodies and joint outer part to be permanently noise-free during operation.

Finally, a vehicle is also proposed which comprises at least one bellows according to the disclosure or a bellows produced by the method according to the disclosure or at least one joint arrangement described above.

BRIEF DESCRIPTION OF THE DRAWINGS

The disclosure, as well as the technical field, are explained in more detail with reference to the figures. Reference is made to the fact that the figures show variants of the disclosure, but the disclosure is not restricted thereto. In the drawings.

DESCRIPTION

Figure 1:
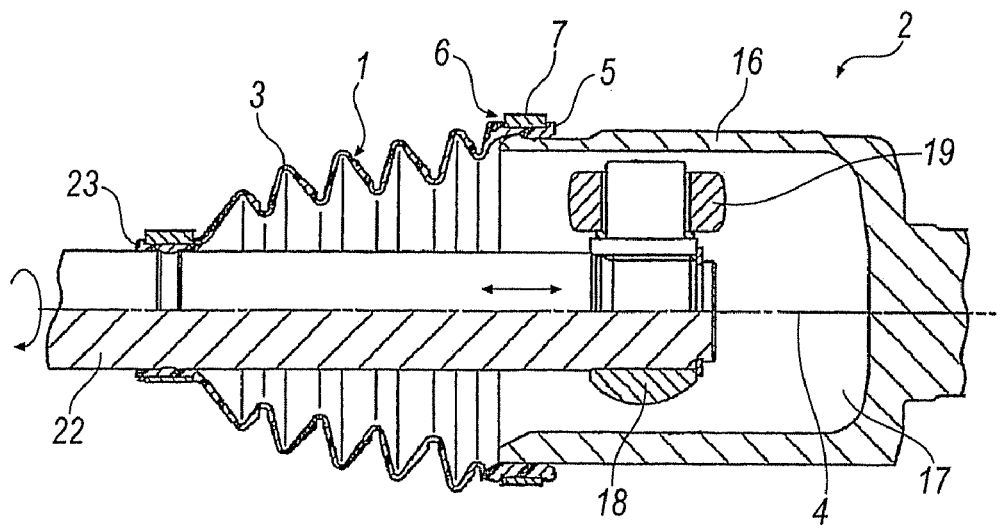
FIG. 1 illustrates a cross-sectional view of the basic construction of a joint arrangement.
Figure 2:
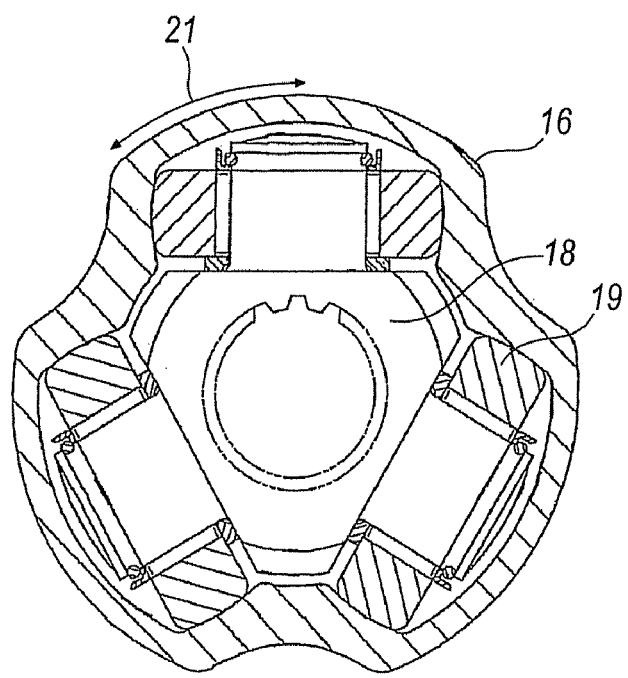
FIG. 2 is a cross-sectional view of a tripod joint.

FIG. 1 illustrates schematically, and in a partial longitudinal section, a joint arrangement 2 in the manner of a tripod joint. In such a tripod joint, a torque is transmitted from a shaft 22 to a joint outer part 16. Relative movement occurs in the direction of the axis 4, which is possible at the same time, between the shaft 22 and the joint outer part 16. Additionally, the shaft 22 may be deflected relative to the axis 4. For torque transmission, the shaft 22 is connected to a joint inner part 18, for example via a splined portion as may be derived from FIG. 2. The joint inner part 18 has, for example, three connectors, on which a corresponding number of rolling bodies 19 are positioned. These rolling bodies 19 are thus positioned in corresponding guide tracks of a hollow space 17 formed by the joint outer part 16. Accordingly, a rotation of the shaft 22 may be transmitted to the housing outer part 16 via the rolling body 19, so that said housing outer part also rotates in the peripheral direction 21.

A joint front face 5 of a bellows 1 is fastened externally by a retaining ring 7 over the circumference 21 of the joint outer part 16. An opposing shaft front face 23 of the bellows 1 is similarly connected to the shaft 22. For compensating for the axial relative movement between the shaft 22 and the joint outer part 16, the bellows 1 has a plurality of pleats. An accurate positioning of the retaining rings 7 thus takes place by correspondingly formed receivers 6 of the bellows 1, which are formed in the direction of the circumference 21, externally in the vicinity of the front faces.

Figure 3:
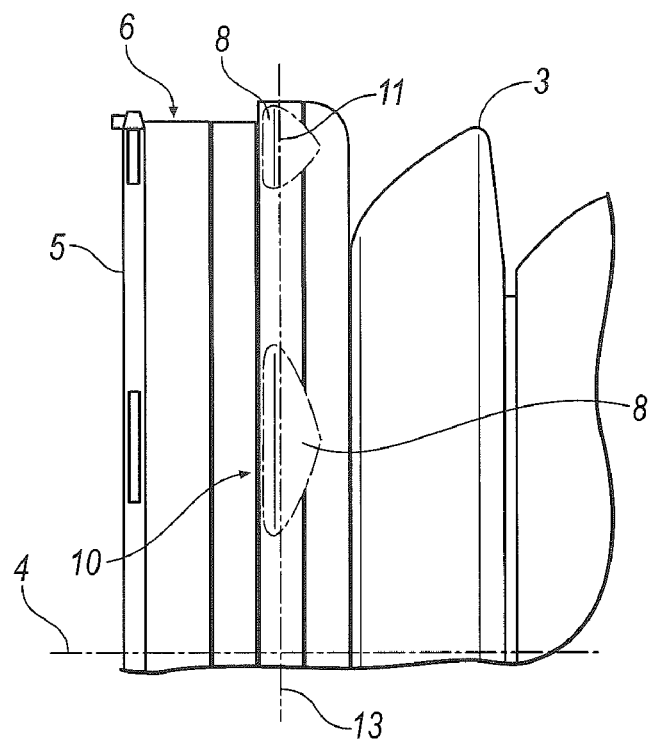
FIG. 3 is a partial view of an embodiment of a bellows.

A first exemplary embodiment of such a receiver 6 on the joint front face 5 is revealed in FIG. 3. For mounting from the joint front face 5, the retaining ring 7 would have to be pushed into the receiver 6. In this case, the retaining ring 7 has sufficient play for a raised portion in the vicinity of the joint front face 5 to be able to be overcome. In order to avoid, henceforth, slipping and/or skewing of the retaining ring 7 toward the pleats 3, the receiver 6 has in the vicinity of the pleats 3 a plurality of outwardly oriented bulged portions 8, which together form an (interrupted) receiving edge 10. In one particular variant, all bulged portions 8 are distributed uniformly over the circumference 21 of the bellows 1, in a common plane 13 that is generally perpendicular to the axis 4 of the bellows 1. The bulged portions 8, which possibly may also be described as local micropleats, are also produced by blow molding, as is the region of the bellows 1 shown here in its entirety.

Figure 4:
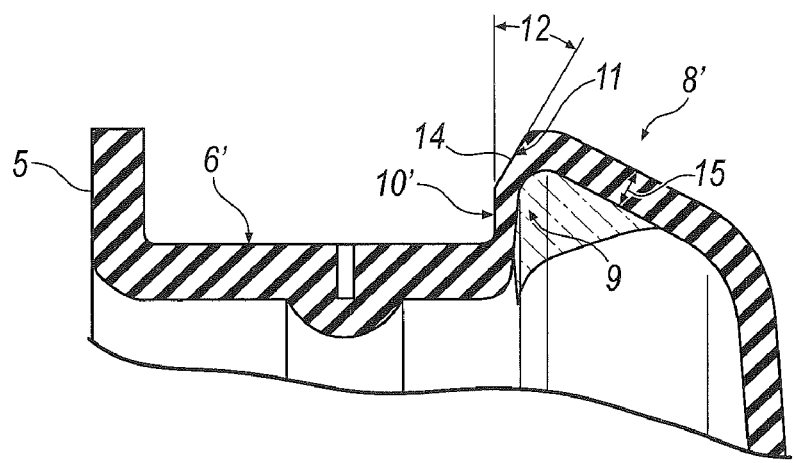
FIG. 4 is a partial view in cross section of a further embodiment of the bellows.

FIG. 4 now shows a further variant of the receiver 6' of a bellows 1 in cross section and in detail. Again, the receiver 6' is formed adjacent to the joint front face 5. The receiving edge 10' located in the direction of the pleats 3 is formed by the illustrated bulged portion 8'. This bulged portion 8' has, due to a recess 9, a wall thickness 15 which remains substantially uniform; the bulged portion 8' is thus not made from a solid material. To avoid tearing in the region of a domed portion 11, the outwardly oriented bulged portion 8' is at an angle 12 to form an oblique receiving edge 10'. This oblique receiving edge 10' is thus formed by a chamfer 14. This chamfer 14 is directly produced by the production method of the bulged portion 8' (in particular by "press blow molding").

FIGS. 5 to 8 are intended to illustrate an exemplary production method for such a bellows. As a starting point, a die 24 is shown which, for example, has a two-part blow mold 31. The outer contour of the bellows to be made is substantially formed in this blow mold 31 by the internal surface 25. Components of this internal surface 25 include indentations 26, which form the pleats 3. At the front face of these two blow molds 31, for example, a holder 32 and a blow head 33 are positioned. Whilst the blow head 33, for example, undertakes the retaining function of the preform and/or the die, the pressurized medium may be introduced into the preform via the blow head 33.

Figure 5:
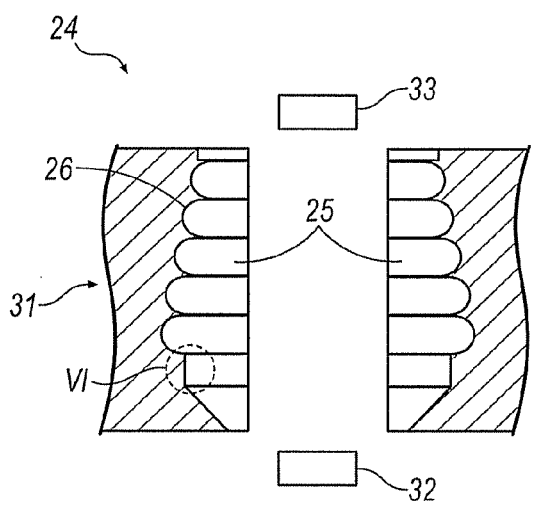
FIG. 5 illustrates a die for producing a bellows.
Figure 6:
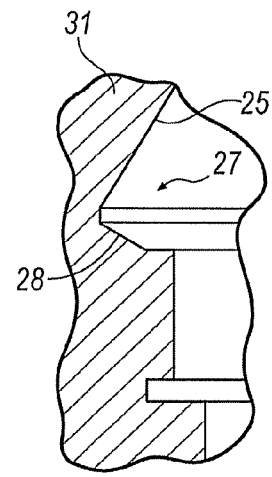
FIG. 6 is an enlarged view of encircled area VI of FIG. 5.

Referring to FIG. 6, which is an enlarged view of encircled area VI from FIG. 5, to produce the bellows according to an embodiment of the disclosure, the die 24 further includes a region of the subsequent joint front face of the bellows and in the vicinity of the last indentation 26, a plurality of bulged portions 27. The bulged portions 27 respectively form an oblique bearing surface 28. This oblique bearing surface 28 is configured to generate a desired angle 12 relative to a domed portion 11 of the bulged portion 8' of the bellows 1 and/or the chamfer 14 thereof.

Figure 7:
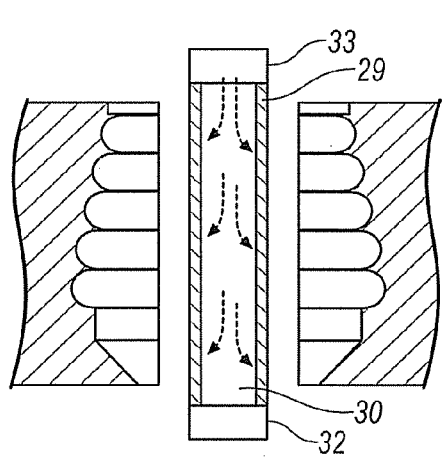
FIG. 7 illustrates a possible initial position for the start of a blow molding process in the die.
Figure 8:
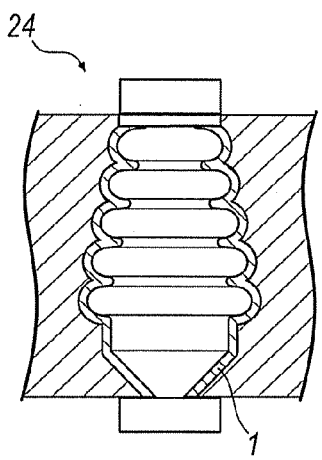
FIG. 8 illustrates a possible result after the blow molding process is completed.

In FIG. 7 a hollow body 29 is now shown between the two blow molds 31. The hollow body may be constructed of a thermoplastic material (TPE). Now, the two blow molds 31 are moved toward the hollow body 29, so that said blow molds 31 form a closed blow mold. After the die 24 is closed, possibly by increasing the temperature, a pressurized medium is introduced into an internal region 30 of the hollow body 29. In this manner, the material of the hollow body 29 increasingly clings to the internal surface 25 of the die (plastic deformation) to form a bellows. This is illustrated, in particular, in FIG. 8. After completing this forming and possibly after a cooling process, the finished bellows 1 may be removed from the die 24, in particular burrs or cylindrical protrusions being able to be treated further. This method permits bellows to be produced using short processing times, and accordingly such bellows are, in particular, suitable for mass production.

Figure 9:
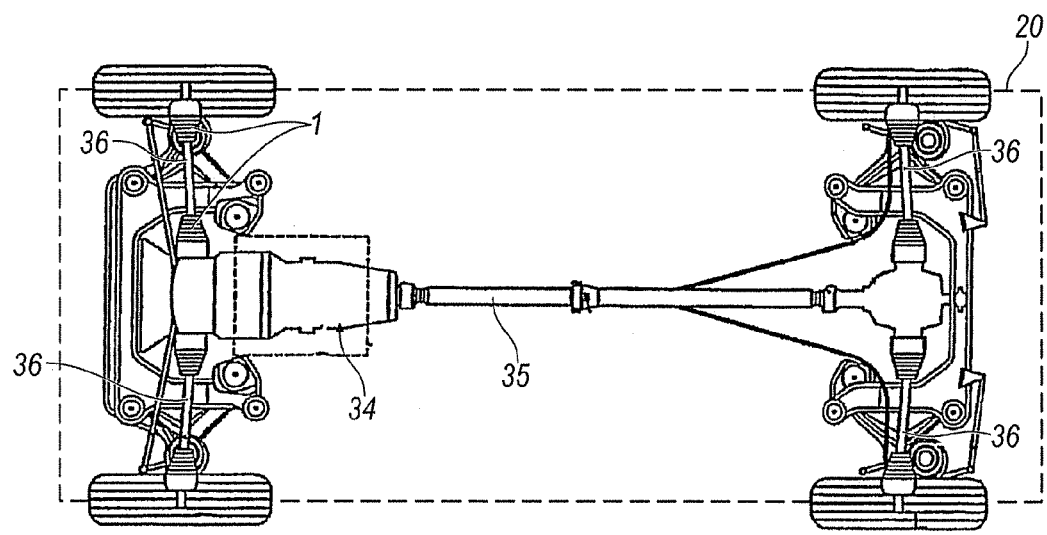
FIG. 9 illustrates a motor vehicle that employs one or more joint arrangements.

In FIG. 9 the field of application of such a bellows may be utilized, is illustrated schematically. The torque transmission in a motor vehicle 20 takes place via a gear unit 34, the torque being transmitted directly to the wheels via lateral shafts 36 or, however, initially via longitudinal shafts 35 to spaced-apart lateral shafts 36 and/or wheels. To this end, different joint arrangements 2 may be used, at least one joint arrangement 2 advantageously comprising the bellows 1 described here.

What is claimed is:

1. A bellows for a joint arrangement comprising: pleats, an axis and a joint front face, in which a region of the joint front face is produced by blow molding and forms a receiver for a retaining ring, the receiver being positioned in the vicinity of the pleats with a plurality of outwardly oriented bulged portions, which form a recess and at least one receiving edge, the receiving edge having at least in the vicinity of a domed portion, an angle which, with a plane generally perpendicular to the axis of the bellows, is in a range of up to 45 degrees, wherein the angle is formed between the receiving edge and the domed portion to prevent tearing of the bulged portions, and wherein the bulged portions are positioned between the at least one receiving edge and the pleats.

2. The bellows as claimed in claim 1, wherein the receiving edge is formed by a chamfer.

3. The bellows as claimed in claim 1, wherein the average wall thickness remains substantially uniform across the pleats and the receiving edge.

4. A method for producing a bellows comprising at least the following steps:
   (a) providing a die with an internal surface which corresponds to an outer shape of the bellows with pleats and with a receiver for a retaining ring, a plurality of bulged portions positioned between at least one receiving edge of the receiver and the pleats, which form an oblique bearing surface, the receiving edge having at least in the vicinity of a domed portion, an angle which, with a plane generally perpendicular to an axis of the bellows, is in a range of up to 45 degrees, wherein the angle is formed between the receiving edge and the domed portion to prevent tearing of the bulged portions,
   (b) positioning a hollow body with an internal region in the die,
   (c) introducing a pressurized medium into the internal region, the hollow body being expanded such that the hollow body comes to bear against the internal surface to form the bellows, and
   (d) removing the bellows from the die.

5. A joint arrangement comprising at least one joint outer part with a hollow space, a joint inner part with a plurality of rolling bodies which is arranged pivotably and rotatably in the hollow space and a bellows that surrounds the hollow space and the joint inner part;
   wherein the bellows further comprises a plurality of pleats, an axis and a joint front face, in which a region of the joint front face is produced by blow molding and forms a receiver for a retaining ring, the receiver being positioned in the vicinity of the pleats with a plurality of outwardly oriented bulged portions which form a recess and at least one receiving edge, the receiving edge having at least in the vicinity of a domed portion, an angle which, with a plane generally perpendicular to the axis of the bellows, is in a range of up to 45 degrees, and further wherein the angle is formed between the receiving edge and the domed portion to prevent tearing of the bulged portions.

6. The joint arrangement of claim 5, wherein the joint arrangement is positioned in a motor vehicle.

* * * * *